N. R. HAAS.
ELECTRIC REGULATOR.
APPLICATION FILED MAY 23, 1916.

1,344,689.

Patented June 29, 1920.

Witnesses

Inventor
Nelson Robert Haas.
By Kerr, Page, Cooper & Hayward
Attorneys

UNITED STATES PATENT OFFICE.

NELSON ROBERT HAAS, OF DAYTON, OHIO, ASSIGNOR TO THE DAYTON ENGINEERING LABORATORIES COMPANY, A CORPORATION OF OHIO.

ELECTRIC REGULATOR.

1,344,689. Specification of Letters Patent. Patented June 29, 1920.

Application filed May 23, 1916. Serial No. 99,443.

*To all whom it may concern:*

Be it known that I, NELSON ROBERT HAAS, a citizen of the United States of America, residing at Dayton, county of Montgomery, and State of Ohio, have invented certain new and useful Improvements in Electric Regulators, of which the following is a full, clear, and exact description.

This invention relates to improvements in the control and regulation of electrical systems.

Among the objects of the present invention is to provide for the control and regulation of electrical systems by combining temperature controlled means with the means of regulation, whereby the effect of the regulation will be automatically varied in accordance with temperature changes.

One manner of carrying out the above object is to provide an electrical system, including a variable speed generator, connected with and adapted to charge a storage battery. This generator has a regulator associated therewith which tends to maintain the voltage of the generator output substantially constant. In combination with this regulator, electro-magnetic means are associated. This electro-magnetic means has provisions, whereby the magnetic effect is automatically variable in accordance with variations in the temperature.

It is well known that the resistance of storage batteries and accumulators vary in accordance with temperature changes, and the degree of variation in the magnetic effect of the electro-magnetic device which is associated with the regulator, is dependent upon the variations of the resistance of the storage battery, due to temperature changes.

Therefore, another object of the present invention is to provide an electrical system, wherein the voltage of the generator output is normally regulated to a predetermined maximum, and then this regulation in turn is varied automatically in accordance with temperature changes, so as to permit of variations in the voltage of the generator output, in accordance with changes in resistance of the storage battery, due to temperature variations.

Further objects and advantages of the present invention will appear from the accompanying drawing, wherein a preferred form of embodiment of the present improvements is clearly shown.

Figure 1:
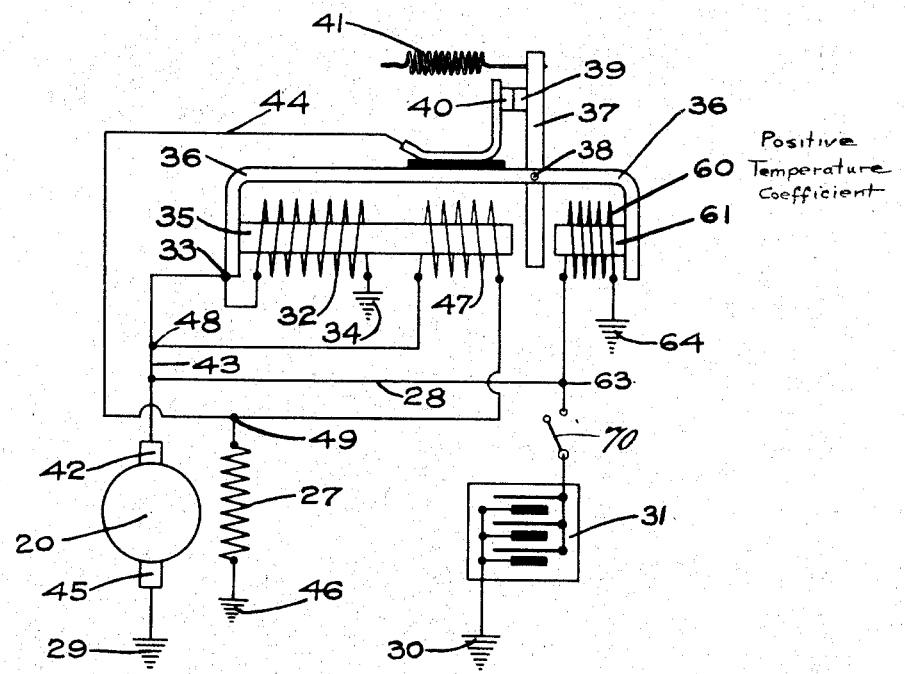
Figure 1 is a diagrammatic view of an electrical system including the present improvements.

Referring to the drawing, and particularly to Fig. 1, there is disclosed an electrical system, including a generator 20, which is shown in the present instance as being of the shunt wound type, the shunt field winding being designated by the numeral 27.

The main line circuit of the generator, which includes the conductor 28 and the ground connections 29 and 30, are connected to the storage battery or accumulator 31, which is adapted to store up current supplied by the generator.

Electrical systems of this type are particularly adapted to be installed on vehicles to furnish electrical power for a variety of functions, such as starting, lighting, ignition, signaling and others, and it will therefore be apparent that these systems are subjected to varying temperature conditions throughout a relatively wide range.

In generators of the shunt wound type, it is advisable to provide some means of regulation, whereby the voltage of the generator output will be limited to a predetermined maximum.

This voltage regulation in the present improvements includes a regulator of what is known as the vibrating type, which includes a main coil 32, having its terminals connected directly across the charging circuit, as at 33 and 34. This coil is wound upon the magnetic core 35, which in turn is mounted upon the frame 36. A pivoted armature 37 is mounted upon the frame 36, as at 38, one end of said armature lying in proximity of the free end of the magnetic core 35, while the opposite end of said armature carries the contact point 39. This contact point is normally pressed against the contact point 40, through the effect of the spring 41.

The contact points 39 and 40 are included directly in the normal field circuit of the electric machine, which includes the following circuit connections:

From the generator 20, through brush 42, conductor 43 to the frame 36 of the regulator, thence to the armature 37, across the contact points 39 and 40 to the conductor 44, thence to the field winding 27, back to the opposite brush 45, via ground connections 46 and 29.

Connected directly across these contact points is a resistance winding 47, which is wound oppositely relative to the coil 32 and is of comparatively high resistance. This winding has one of its terminals connected to the wire 43, as at 48, while the opposite terminal of the coil is connected to the field circuit at the point 49.

From the above description, it will be apparent that when the voltage across the main circuit exceeds a determined maximum, the effect of the coil 32 will so energize the core 35 that the armature 37 will be attracted toward said core and thereby separate the contacts 39 and 40. This will break the short circuit around the resistance winding 47.

Now, as soon as the current passes through this high resistance winding, the demagnetization of the core 35 will be accelerated, in view of the fact that this winding 47 is opposed in its magnetic effect to the winding 32. This will result in the armature quickly returning to its normal position, under the influence of the spring 41.

Successive operations of the regulator will occur until such time as the voltage across the main line circuit has decreased below a determined maximum. By the above arrangement, the voltage across the generator brushes will be maintained at a substantially constant voltage.

As has been explained heretofore, the main line circuit of the generator is connected to the opposite sides of the storage battery 31, and tends to maintain this battery in charged condition.

It is well known in the battery art that the internal resistance of a battery varies in accordance with temperature changes. That is, when the temperature is low, or during extremely cold weather, the internal resistance of the battery is proportionately high, while during warm weather or when the temperature is high, the internal resistance of the battery is relatively low.

Therefore, if the voltage of the generator is maintained at a predetermined constant, the charging of the battery will not be efficiently effected. That is, supposing that the regulator tends to hold the voltage of the generator constant, so as to properly charge the battery during hot weather, when the resistance of the battery is relatively low, the same voltage of the generator will not be sufficient to effect a complete charging of the battery during cold weather, when the resistance of the battery is relatively high.

In the present improvements, there is associated with the regulator, an electro-magnetic unit which includes a coil 60, connected directly across the main circuit. This coil is preferably constructed of such material that its resistance will vary in accordance with temperature changes. That is, iron wire has been found to be particularly adapted for this purpose.

This iron wire coil 60 is mounted upon a core 61, which in turn is fastened to one end of the frame 36. This core 61 is oppositely disposed relative to the core 35, and is so arranged that a predetermined space is left between the ends of the core 61 and the core 35.

The armature 37 is so positioned that one end thereof is normally positioned within the space between the core 61 and the core 35. The opposite terminals of this iron wire coil 60 are connected directly across the main circuit of the electric machine, as at the point 63 and ground connection 64. The coil 60 is so wound upon the core 61 that the magnetic effect of the core 61, relative to the armature 37 will be directly opposed to the magnetic effect of the coil 32 and the core 35.

Now this opposing effect of the core 61 and the winding 60 will be variable in accordance with temperature changes in said windings, inasmuch as the resistance of iron wire tends to decrease in cold weather. In other words, the resistance of the iron wire increases as the temperature increases. It will therefore be seen that in cold weather, the magnetic effect of the core 61 and the winding 60 will be greater than in hot weather, and therefore the opposing effect relative to the coil 32 and the core 35, will be such that the armature 37 will not actuate under the same conditions as when the magnetic effect of the core 61 and winding 60 is small.

It will therefore result that the vibrations of the armature will not be as rapid, and also that a higher voltage across the generator circuit will be necessary to properly build up the magnetism in the core 35, to effect the attraction of the armature 37. This results in an increased voltage across the generator terminals, and this increase in voltage is directly proportioned with regard to the increase in the resistance of the storage battery, so that the generator output will at all times be of sufficient voltage to effectively and efficiently charge the storage battery.

In other words, as the temperature of the battery decreases its resistance will increase, thereby reducing the current passing through it from the generator, unless some means are provided for automatically varying the operation of the regulator in accordance with temperature changes. In the present invention the regulator operates in colder weather so as to cause the generator to produce current at a higher voltage than in warmer weather. In this manner the battery is charged at the proper rate at all times.

Figure 2:
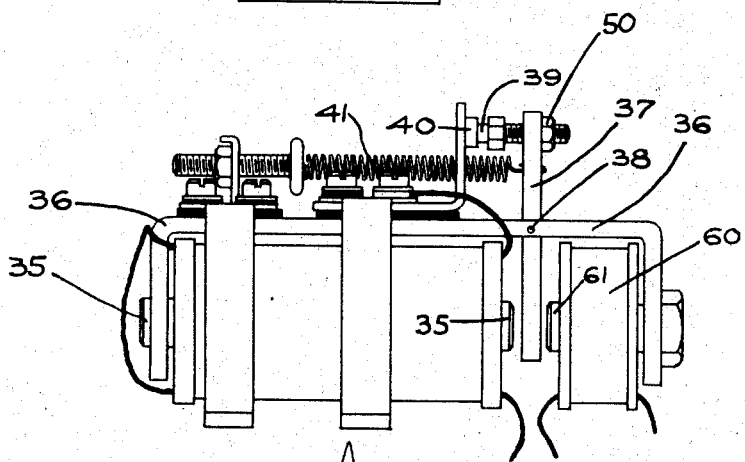
Fig. 2 is an enlarged detail view in elevation of the regulator.

It will be apparent that by changing the air gap between the armature 37 and the cores 61 and 35 respectively, different effects may be secured. That is, the opposing effect of the winding 60 and the core 61 may be materially increased or decreased by changing the air gap between the armature and the core 61. This adjustment of the air gap is effected by the adjustment of the nut 50, see Fig. 2, which will tend to change the position of the armature 37, in accordance with the degree of adjustment.

It will be noted that the winding 32 creates magnetic flux traversing one path, while the winding 60 creates independently magnetic flux traversing another path, the armature 37 being a portion which is common to both paths of flux or both magnetic fields. In this manner the windings 32 and 60 can operate substantially independently of each other producing substantially no inductive effects upon one another.

The connection between the battery 31 and the conductor 28 of the main line circuit, may be by means of a switch 70, which may be hand operated or of the usual automatic type.

It is also to be understood that while the form of regulation particularly referred to above is of the voltage regulation type, the invention is also applicable to other types of regulation; all of which variety of devices may be referred to as means for regulating the out-put of the generator.

While the form of mechanism herein shown and described constitutes a preferred form of embodiment of the invention, it is to be understood that other forms might be adopted, all coming within the scope of the claims which follow.

What is claimed is as follows:

1. In an electrical system, the combination with a generator; of a regulator including an armature for controlling electric circuits, an electro-magnet for moving the armature, means for restoring said armature to normal position, and means independent of the restoring means operating according to temperature changes therein for opposing said magnet and assisting said restoring means.

2. In an electrical system, the combination with a generator; of a regulator including an armature for controlling the opening and closing of contacts, an electro-magnet for attracting said armature to open said contacts, a spring normally holding the contacts closed, and means independent of the spring acting in accordance with temperature changes therein for assisting said spring in maintaining the contacts closed.

3. In an electrical system, the combination with a generator; of a regulator including an armature for controlling electric circuits, an electro-magnet for moving said armature in one direction, a spring for moving the armature in the opposite direction, and electro-magnetic means operating in accordance with changes of temperature therein for assisting said spring, said means operating without changing the flux produced by the first magnet.

4. In an electrical system, the combination with a generator; of a regulator including an armature for controlling electric circuits, an electro-magnet for controlling said armature forming with the armature a magnetic circuit, a spring for restoring the armature to normal position, and a second magnet forming with said armature a second magnetic circuit and constructed and arranged to vary its magnetic effect according to temperature changes therein.

5. In an electrical system, the combination with a generator; of a regulator including an armature for controlling electric circuits, an electro-magnet for controlling said armature forming with the armature a magnetic circuit, a spring for restoring the armature to normal position, and a second magnet forming with the armature a magnetic path, and provided with a winding having a positive temperature coefficient whereby the magnetic effect produced by said magnet will vary according to the changes in temperature in said winding.

6. In an electrical system, the combination with a generator; of a regulator including an armature for controlling electric circuits, an electro-magnet for controlling said armature forming with the armature a magnetic circuit, a spring for restoring the armature to normal position, and a second magnet forming with the armature a magnetic path, and provided with an iron wire winding whereby the magnetic effect produced by said magnet will vary according to the changes in temperature in said winding.

7. In an electrical system, the combination with a generator; of a regulator including a magnet frame having spaced core members, an armature coöperating with the frame and with said cores to provide two magnetic circuits with an air gap between each core and the armature, a controlling magnetic winding on one core for moving said armature in one direction, spring means for moving the armature in the opposite direction, and a magnetic winding on the other core acting in accordance with variations in the temperature for assisting the spring and opposing the controlling magnet.

8. In an electrical system, the combination with a generator having a field winding and circuit; a storage battery; a charging circuit connecting the generator and the storage battery; of a regulator associated with said generator and including a voltage winding and a resistance winding, including means controlled by the voltage winding adapted to regulate the field circuit of the generator and to connect the resistance winding in series with the field winding, whereby to control the output of the generator, and including a temperature controlled electro-magnet for varying the operation of the circuit breaking means, in accordance with temperature changes in said magnet, whereby as the resistance of the storage battery varies in accordance with temperature, the output of the generator will also vary in determined proportions.

9. In an electrical system, the combination with a variable speed generator having a field winding and circuit; of a storage battery; a charging circuit connecting the storage battery and the generator; an electro-magnetic regulator controlled by the voltage across the charging circuit for controlling the normal field circuit of the generator to control the voltage of the generator, and including electro-magnetic means automatically controlled by variations in temperature in said means for opposing the operation of said circuit controlling means, whereby the voltage of the generator will vary in accordance with temperature variations.

10. In an electrical system, the combination with a variable speed generator having a field winding and circuit; a storage battery; a charging circuit connecting said generator and battery; of a regulator including a controlling coil connected across the charging circuit, and a resistance winding oppositely wound relative to said controlling coil; circuit controlling means normally included in the field circuit of the generator and adapted to be actuated by the controlling coil to control the field circuit and to introduce the reverse resistance winding into said circuit and thereby control the voltage of the generator, said regulator including a temperature controlled coil, the resistance of which varies with temperature changes in said coil, for opposing the effect of the controlling coil relative to the circuit controlling means, whereby the operation of said circuit controlling means will be varied in accordance with the effect of the temperature controlled element.

11. In an electrical system, the combination with a variable speed generator having a field winding and circuit, a storage battery; a charging circuit connecting said battery and generator; of a regulator including a voltage winding, a reverse resistance winding, and circuit breaking means normally tending to close the field circuit of the generator, but adapted to be operated by the effect of the voltage winding to introduce the reverse resistance winding into the generator field circuit, whereby to control the voltage of the generator output, said regulator including an iron wire winding, the resistance of which varies in accordance with temperature changes, adapted to variably oppose the effect of said voltage winding relative to the circuit breaking means, in accordance with the variations in temperature changes, whereby the voltage of the generator will be varied in accordance with the variations of temperature.

12. In an electrical system, the combination with a variable speed generator and a storage battery connected therewith; of a regulator including electro-magnetic provisions responsive to the voltage of the generator for controlling the generator field circuit, and including electro-magnetic means responsive to the voltage of the generator and to changes in temperature in said means for varying the effect of said provisions in accordance with temperature changes.

13. In an electrical system, the combination with a variable speed generator having a field winding and circuit, and a main circuit; of an electro-magnetic regulator including an energizing coil and core, an armature operable by the energization of said core to regulate the current in the field circuit and including a temperature controlled device independent of the generator including a magnetic winding and core associated with the armature of the regulator and adapted to oppose the operation of said armature magnetically in varying degrees, in accordance with the variations in temperature of said winding.

14. In an electrical system, the combination with a generator, including a field winding and circuit and a main circuit; of a regulator including a frame, core and armature forming a magnetic path; a main coil mounted on said core and connected across the main circuit; circuit connections associated with the field circuit and actuated by said armature to regulate said circuit, said regulator including a controlling coil controlled independently of the generator, the resistance of which varies with temperature variations for varying the operation of the armature to open and close the field circuit, by opposing the effect of the main coil.

15. In an electrical system, the combination with a generator having a field winding and circuit, and a main circuit; of a regulating device, including a frame; an armature fulcrumed on said frame; a movable contact actuated by said armature; a stationary contact; said contacts being associated with the field circuit of the generator; means for normally holding said contacts in engaging position; of a voltage coil connected across the main circuit and adapted to actuate the armature when the voltage of the main circuit rises beyond a predetermined point, and thereby separate the said contacts; a resistance coil oppositely wound relative to the main coil and connected across said contacts and adapted, upon the separation of the contacts, to be cut into the field circuit; and an electromagnetic device, the magnetic effect of which varies in accordance with temperature variations, adapted to oppose the effect of the main coil in varying degrees in accordance with variations in temperature.

16. In an electrical system, the combination with a generator; of a regulator including an armature for controlling electric circuits, an electro-magnet for moving said armature, means for restoring said armature to normal position, and a second electro-magnet having a high temperature coefficient winding for exerting a modifying effect upon the first-named magnet, and assisting said restoring means.

17. In an electrical system, the combination with a generator; of a regulator including an armature for controlling electric circuits, an electromagnet for moving said armature, a spring for restoring said armature to normal position, a second electromagnet coöperating with said armature and arranged to modify in accordance with temperature changes the magnetic attraction of said first magnet for said armature, and means for adjusting the normal position of said armature relative to said magnets whereby to vary said modifying effect of said second magnet.

18. In an electrical system, the combination with a generator; of a regulator including an armature for controlling electric circuits, an electromagnet for moving said armature, means for restoring said armature to normal position, temperature responsive means independent of said restoring means for opposing said magnet and assisting said restoring means, and adjustable provisions for changing the opposing effect of said temperature responsive means.

In testimony whereof I affix my signature in the presence of two subscribing witnesses.

NELSON ROBERT HAAS.

Witnesses:
J. W. McDONALD,
O. D. MOWRY.